United States Patent Office 3,414,537
Patented Dec. 3, 1968

---

3,414,537
STABILIZATION OF POLYAMIDES
Gerardus P. Dikötter, Geleen, and Arnoldus A. W. Schaapveld and Pierre J. Franssen, Stein, Netherlands, assignors to Stamicarbon N.V., Heerlen, Netherlands
No Drawing. Filed Feb. 2, 1966, Ser. No. 524,465
Claims priority, application Netherlands, Feb. 4, 1965, 6501394
2 Claims. (Cl. 260—45.75)

ABSTRACT OF THE DISCLOSURE

Stabilizers for polyamide compositions are disclosed, composed of the complex compounds of a copper salt and lysine hydriodide.

---

This invention relates to the stabilization of polyamides.

The mechanical properties of polyamides are known to be adversely affected by light, heat and air when the polyamides do not contain a stabilizer.

Many substances have been recommended in the past as stabilizers for polyamides; however, the effective long-term stabilization of the mechanical properties and the resistance against discoloration remains a problem which requires satisfactory solution. This is especially so since the production of polyamides is increasing and the applications of these products are becoming more numerous. It is of great importance that excellent stabilizers be available.

A mixture of an organic copper salt and phosphorus triiodide has been proposed for the stabilization of polyamides (see German Patent No. 1,152,816). This stabilizer may be added to the monomer before the polymerization, or it may be added to the polyamide during or after the polymerization.

It has also been proposed to use a complex compound of a copper halide with an amine, a diamine or a polyamine optionally with a phosphorus acid or a phosphoric acid or a salt of these acids, for stabilizing polyamides (see British Patent No. 922,706).

It is an object of the present invention to provide a new and improved stabilizer and a novel process for stabilizing polyamides.

A further object of the invention is to provide novel and improved stabilized polyamide compositions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

This invention provides the improved stabilization of polyamides with a stabilizer containing copper and an organic iodine compound, which when added either before, during or after the polymerization reaction, produces exceptionally stable products. More specifically, the present invention contemplates as the stabilizer the use of a complex compound of lysinehydriodide with a basic copper salt, such as basic copper carbonate, as an example.

The complex compounds of lysinehydriodide-copper provided as stabilizers by this invention can be obtained by adding a basic copper salt, for example basic copper carbonate or basic copper acetate, to an aqueous solution of lysinehydriodide and stirring the mixture until a clear solution results. The complex compound of lysinehydriodide-copper can be separated from this solution by evaporation of the water or by the addition of a precipitating agent, for example ethyl alcohol, thereto. The complex thus precipitated can be isolated by filtration and drying. Preferably, the complex so obtained is finely ground before incorporation into the polyamides to be stabilized.

In preparing the complex of lysinehydriodide-copper, generally two moles of the lysinehydriodide are required for each gram atom of copper in the basic copper salt. As a matter of practice, it is preferred to use a small excess (e.g., 5 to 25%) of the basic copper salt to insure that all of the lysinehydriodide is reacted. However, this excess of basic copper salt is not necessary, or critical. Generally, the reaction is carried out at room temperature although slightly lower or higher temperatures can be employed.

Although ethanol is a preferred compound for precipitating the complex compound of the invention, other precipitating agents may also be used, such as lower alkanols, aceton and mixtures of lower alkanols with lower dialkylethers. The amount of the precipitating agent used is not critical although for economic reasons sufficient precipitating agent should be used to insure the complete precipitation of the complex compound formed. Generally from about 200 to 750 parts of the ethanol per 100 parts of aqueous solution is sufficient.

The amount of stabilizer used according to the invention may also be varied within wide limits. In most cases it is not necessary to use more than 0.5% by weight of stabilizer with respect to the amount of polyamides. Even in very small amounts, e.g. 0.05–0.15% by weight, a sufficient degree of stabilization is usually achieved. Preferably, 0.1 to 0.25% by weight of the stabilizer is used. Of course, larger amounts of the stabilizer may be used, e.g. 0.5 to 2%, but generally amounts in excess of 1% will not bring any proportionately added stabilizing effect.

The stabilizers may be added before, during, or after the polymerization of the polyamides. If the stabilizer is to be added before the polymerisation, it can be added to the monomeric materials to be polymerized while they are kept in storage, either as a solid or as a liquid substance. to be added before the polymerization, it can be added to to the polymerization reactor during or after the polymerization reaction.

The stabilizers according to the invention are suited for the stabilization of polyamides in general, including polymerization products of lactams, e.g. caprolactam, oenantholactam, laurinolactam, and polycondensation products from diamines and dicarboxylic acids as well as polymerization products of amino-carboxylic acids.

Example I

About 0.6 gm. mole of basic copper carbonate was added to 2.0 gm. moles of lysinehydriodide in 1500 cc. of water. The mixture was stirred at room temperature for about 30 min. to obtain a clear solution. About 2500 cc. of ethanol and 1000 cc. of diethylether were then added to the resultant mixture to precipitate the complex lysinehydriodide-copper compound. This complex compound was then filtered and dried. The dried blue coloured complex compound so obtained weighed 600 gms.

Example II

The effectiveness of the stabilizer prepared in accordance with the procedure of Example I was evaluated by measuring the relative viscosity of the stabilized polyamides. By the term "relative viscosity" is meant the viscosity of a solution of 1 gram of polyamide in 100 grams of sulfuric acid (96% by weight) at 20° C. with respect to the viscosity of this sulfuric acid.

In order to obtain comparable results in the following tests the polyamide samples in each instance were prepared in the same way, namely, by heating a mixture of 96 grams of caprolactam, 4 g. of water, 0.015 g. of acetic acid and the stabilizer sample for 18 hours at a temperature of 260° C. in a nitrogen atmosphere. The stabilizer sample used was the complex compound obtained by the process of Example I, which was finely ground to increase the effectiveness and uniformity of distribution of the stabilizer in the polyamide. After the polymerization was completed, the polyamide was made into a thread which was wound up and tested by exposing it to air at 205° C. in an oven. The relative viscosity was measured after 6 hrs. and after 18 hrs.

The results so obtained are shown in the table below.

TABLE

| Amount of stabilizer (percent by weight) | Relative viscosity | | |
|---|---|---|---|
| | After 0 hr. | After 6 hrs. | After 18 hrs. |
| 0.04 | 2.58 | 2.38 | 2.05 |
| 0.05 | 2.44 | 2.52 | 2.00 |
| 0.06 | 2.43 | 2.36 | 2.21 |
| 0.075 | 2.56 | 2.55 | 2.32 |
| 0.10 | 2.36 | 2.63 | 2.45 |
| 0.125 | 2.48 | 2.72 | 2.49 |
| 0.25 | 2.53 | 2.81 | 2.62 |
| 0.5 | 2.35 | 2.95 | 2.83 |

Polyamide made in accordance with the above procedure but which was not stabilized was charred after 6 hours of heating at the above conditions. The results herein clearly demonstrate the stabilizing effect of the complex compounds of the invention.

Although the results shown in the table above were obtained by adding the stabilizers before the polymerization of the polyamide, these results are typical and similar to results obtained when the stabilizers were added to polymerized polyamide. It is a special feature of the present invention that the novel stabilizers herein can be conveniently prepared by simple procedure and thereafter be easily incorporated into the polyamide to be stabilized.

What is claimed is:

1. A stabilised polyamide composition comprising a polyamide and a stabilising amount of the copper complex compound of lysine hydroiodide, said complex compound having the molecular structure of the complex compound made by dissolving a copper basic salt and lysine hydroiodide in an aqueous solution in a ratio of approximately 1 gram atom of copper for each two gram moles of lysine hydroiodide, and reacting at a temperature of at least room temperature.

2. The composition of claim 1 wherein the water is removed after producing the said complex compound.

References Cited
UNITED STATES PATENTS 2,720,527  10/1955  Wolf _____ 260—438.1
2,705,227  3/1955  Stamatoff _____ 260—45.7

DONALD E. CZAJA, *Primary Examiner.*

V. P. HOKE, *Assistant Examiner.*